US012079500B1

(12) United States Patent
Saladi et al.

(10) Patent No.: US 12,079,500 B1
(45) Date of Patent: Sep. 3, 2024

(54) GLOBAL DEDUPLICATION IN A CLOUD-BASED STORAGE SYSTEM

(71) Applicant: Druva, Sunnyvale, CA (US)

(72) Inventors: Naresh Saladi, Milpitas, CA (US); Abhijit Dinkar, San Jose, CA (US); Murali Bashyam, Fremont, CA (US)

(73) Assignee: DRUVA, Sunnyvale, CA (US)

( * ) Notice: Subject to any disclaimer, the term of this patent is extended or adjusted under 35 U.S.C. 154(b) by 385 days.

(21) Appl. No.: 16/556,175

(22) Filed: Aug. 29, 2019

Related U.S. Application Data

(60) Provisional application No. 62/724,727, filed on Aug. 30, 2018.

(51) Int. Cl.
*G06F 16/13* (2019.01)
*G06F 3/06* (2006.01)

(52) U.S. Cl.
CPC .......... *G06F 3/0641* (2013.01); *G06F 3/0608* (2013.01); *G06F 3/0614* (2013.01); *G06F 3/067* (2013.01); *G06F 16/137* (2019.01)

(58) Field of Classification Search
CPC .... G06F 3/0641; G06F 16/137; G06F 3/0608; G06F 3/0614; G06F 3/067
USPC ....................................................... 707/692
See application file for complete search history.

(56) References Cited

U.S. PATENT DOCUMENTS

| | | | | |
|---|---|---|---|---|
| 8,396,841 B1 * | 3/2013 | Janakiraman | ......... | G06F 3/0608 707/802 |
| 8,898,114 B1 * | 11/2014 | Feathergill | .......... | G06F 11/1453 707/648 |
| 9,734,156 B1 * | 8/2017 | Bajpai | ................. | G06F 16/1752 |
| 10,152,487 B1 * | 12/2018 | Patwardhan | ........ | G06F 21/6218 |
| 10,346,297 B1 * | 7/2019 | Wallace | ................ | G06F 3/0608 |
| 2011/0055471 A1 * | 3/2011 | Thatcher | ............... | G06F 3/0679 711/216 |
| 2011/0161723 A1 * | 6/2011 | Taleck | ................ | G06F 11/1469 714/E11.073 |
| 2013/0173553 A1 * | 7/2013 | Apte | ........................ | G06F 7/00 707/E17.014 |
| 2015/0127621 A1 * | 5/2015 | Kuo | ........................ | G06F 3/067 707/692 |
| 2015/0293699 A1 * | 10/2015 | Bromley | ............... | G06F 3/0629 711/161 |
| 2017/0371917 A1 * | 12/2017 | Srinivasan | ........ | G06F 16/24568 |
| 2018/0060348 A1 * | 3/2018 | Power | ................... | G06F 16/137 |

OTHER PUBLICATIONS

Huijun Wu, et al., "HPDedup: A Hybrid Prioritized Data Deduplication Mechanism for Primary Storage in the Cloud," arXiv:1702.08153v2 [cs.DC] Apr. 16, 2017, 14 pages.

* cited by examiner

*Primary Examiner* — Hosain T Alam
*Assistant Examiner* — Robert F May
(74) *Attorney, Agent, or Firm* — Kwan & Olynick LLP

(57) ABSTRACT

Techniques and mechanisms described herein provide for global deduplication in a cloud-based storage system. According to various embodiments, a global segment reference map can be created for data segments when a data segment has not been previously added to the global segment reference map. For each data segment not added to the global segment reference map, those data segments can be deleted from a cloud storage location.

20 Claims, 12 Drawing Sheets

GLOBAL DEDUPLICATION IN A CLOUD-BASED STORAGE SYSTEM

PRIORITY DATA

This patent document claims priority to U.S. Provisional Patent Application No. 62/724,727, titled "Global Deduplication in a Cloud-Based Storage System," by Saladi et al., filed on Aug. 30, 2018, which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

The present invention generally relates to data management across various public cloud storage providers, and more particularly relates to a method and a system for managing vast amounts of data across public cloud storage providers by implementing global deduplication in a cloud-based storage system.

BACKGROUND

Because cloud storage is distributed, aggregate throughput is high, but individual object performance is low. There is a lack of standardized storage access and management functionality in the area of cloud storage. Consequently, developers usually customize their application to use proprietary application programming interfaces (APIs) provided by cloud storage vendors. Accordingly, improved techniques for interacting with cloud storage systems are desired.

BRIEF DESCRIPTIONS OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Figure 1:
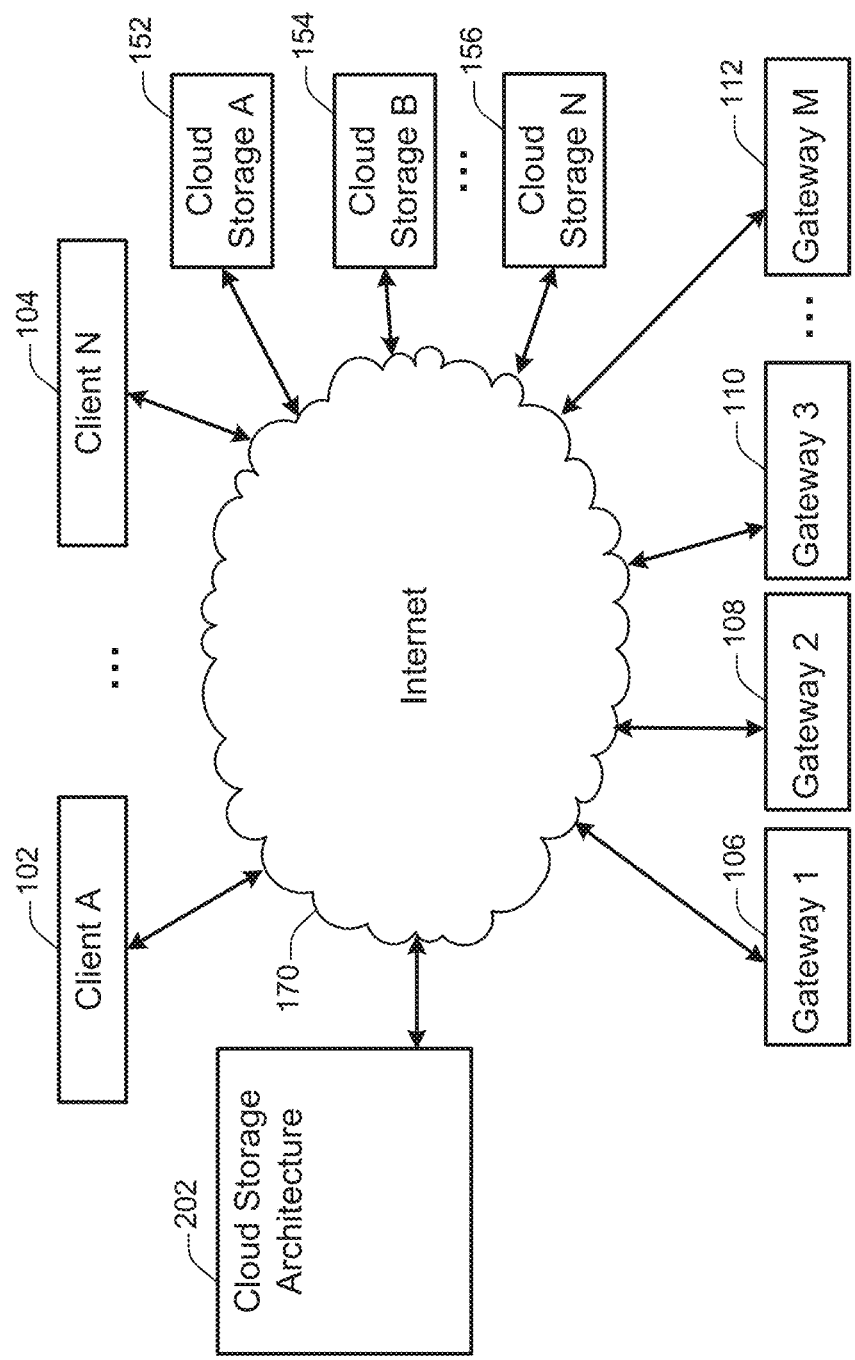
FIG. 1 illustrates an example of a system 100 for managing data across cloud-based and on-premises storage systems, configured in accordance with one or more embodiments.

Reference will now be made in detail to some specific examples of the invention including the best modes contemplated for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of specific configurations of client machines and cloud storage providers. However, it should be noted that the techniques of the present invention apply to a wide variety of such configurations. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

EXAMPLE EMBODIMENTS

Enterprise data backup/archive applications typically interface with storage devices using standard storage protocols such as Network File System (NFS), Common Internet File System (CIFS), Internet Small Computer Systems Interface (iSCSI) Tape, Fiber Channel Tape, and Network Data Management Protocol (NDMP). These interfaces are generally presented by high performance, low latency storage systems.

A storage administrator is also accustomed to a variety of storage management features such as centralized management of all storage assets, usage tracking, seamless data movement across storage tiers, snapshot and cloning of storage objects such as files, directories, volumes, and tapes.

Cloud storage, on the other hand, is high latency. Because cloud storage is distributed, aggregate throughput is high, but individual object performance is low. Further, cloud storage does not support standard storage protocols mentioned above. There is a lack of standardized storage access and management functionality in the area of cloud storage. Consequently, each user of cloud storage has to heavily customize their application to use proprietary application programming interfaces (APIs) provided by cloud storage vendors such as Amazon Web Service (AWS), Microsoft Azure, Google Cloud, and several others. Accordingly, improved techniques for interacting with cloud storage systems are desired.

In many companies, client machines are configured to store information such as backup data to a network-attached storage system, with which the client machines communicate via a standard data storage protocol. Because cloud storage providers generally do not support such protocols, this has resulted in creating of a gap in what storage Enterprise backup/archive applications support and how cloud storage presents itself to end user and applications. Moreover, cloud storage management is lacking in terms of pan-cloud storage management functionality that a storage administrator is accustomed to.

Storage solutions increasingly involve storing files on internet-accessible cloud storage solutions instead of, or in addition to, locally accessible storage. Conventional approaches to cloud storage involve ingesting each file's data and metadata into a single object in cloud storage. However, such approaches end up limiting the ingest and restore rate of that file to the single object's write or read throughput of a server. For many servers, such a limit may be around 60 MB/s. By extension, this approach severely limits the overall IO throughput of the storage solution.

Conventional techniques have other problems as well. Data deduplication and other storage optimization techniques typically require relatively small chunks of data to provide efficiency. Accordingly, ingesting each file's data as a unit does not allow for many types of storage optimization. In addition, the storage of each file as a unit imposes high egress transaction and access cost when accessing a particular file's data. Further, the storage of each file as an unencrypted unit leaves data protected only by the security protections associated with the cloud storage provider's systems.

According to various embodiments described herein, the network-attached storage system may be replaced with a virtual machine configured to facilitate communication between a client machine and a cloud storage provider. From the perspective of the client machine, the virtual machine appears identical or nearly identical to the network-attached storage system. However, the virtual machine does not store the data locally but instead acts as an interface for storing the data on the appropriate cloud storage system.

According to various embodiments, techniques and mechanisms described herein virtualize cloud storage from multiple vendors and presents standards-based access and management interface to cloud storage. Further, techniques and mechanisms described herein may be used to simplify usage of cloud storage by Enterprise Information Technology (IT) applications without any change to the application itself.

According to various embodiments, techniques and mechanisms described herein provide for improved efficiency and speed and reduced costs when ingesting and accessing files in a cloud storage environment. Furthermore, techniques and mechanisms described herein provide for improved security against unauthorized data access. Accordingly, such techniques provide for substantially improved performance of storage solutions in which data is stored in the cloud.

According to various embodiments, techniques and mechanisms described herein may be used to provide improved performance for a variety of applications. Such applications may include, but are not limited to: storage target for backup applications, direct backup and restore of data, and long term archival of data in the cloud.

In some embodiments, a file may be broken up into multiple units referred to herein as segments. A segment may be stored as a blob in Azure Storage, an S3 object in AWS, or any other suitable object in a cloud storage solution. Segments may be of fixed or variable size. Each segment may then be uploaded to the cloud as a separate object. Multiple segments may be uploaded concurrently, effectively parallelizing the ingest operation by striping that file's data across several objects in the cloud. As the file is ingested, the segments that make up the file and the corresponding logical data offsets are tracked in a file-system metadata structure called the segment map. In particular embodiments, each file may have associated therewith its own segment map. Alternately, each file may be represented as a set of entries within a shared segment map data structure.

In some implementations, each segment may be of a fixed or variable length. For instance, the length may be between 1 MB and 4 MB. According to various implementations, a smaller or larger segment length may be used. However, decreasing the segment length too much may be impractical due to the fixed cost associated with each storage transaction in a cloud computing environment. Similarly, increasing the segment length too much may reduce the effect of optimization techniques such as segment deduplication.

According to various embodiments, dispersing a file into multiple segments upon ingestion and then ingesting those segments in parallel addresses the twin problems of optimizing both cloud storage and network optimization. In addition, such an approach eliminates the single object access bottleneck that is present when each file is ingested as a unit.

According to various embodiments, each segment may be encrypted using an appropriate encryption algorithm. For example, envelope encryption based on an AES-256 standard may be used. By dispersing a file into multiple segments and separately encrypting each segment, the system may provide an additional level of indirection and security.

In some embodiments, during the upload process, all segments previously uploaded are tracked in a dictionary maintained on the system itself. Then, only the unique segments not present in the dictionary are considered for uploading, thereby achieving cloud storage and network optimization. That is, the system need not upload duplicate segments.

In some implementations, the segment map may be read ahead of incoming IO when processing read requests. Then the addressed segments may be prefetched in parallel and stored in a segment cache. Multiple segments may then be downloaded in parallel, effectively parallelizing the restore or read operation. Such techniques may help to alleviate the problem exhibited by conventional techniques with respect to restricted read throughput. Such techniques may involve tracking multiple segments being downloaded and maintaining state for the already downloaded segments in a segment cache and the on-disk segment store.

According to various embodiments, techniques and mechanisms described herein may provide for reduced egress cost to access a file's data in part by caching the most recently uploaded segments in the segment cache. The segment cache may be maintained in memory as a standard least-recently used (LRU) based cache, with the evicted segments being stored on-disk in a segment store. Most recently read and uploaded segments may be stored in the segment cache, and eventually may be stored in the on-disk segment store. The segment store may be implemented as an on-disk, LRU based priority queue.

In some embodiments, the system is configured to detect unique segments and tracking multiple segments being uploaded concurrently by holding that state in parallel transactions. In addition, the system may track the completion of all the transactions in order to transition a file to a fully uploaded state.

In conventional deduplication systems, storage servers are tightly coupled and reside locally in a data center. One approach to deduplication in such configurations has been to require a standalone server to implement a deduplication dictionary. However, that server quickly becomes a bottleneck to data ingestion. Another approach to deduplication in such configurations is to distribute the deduplication dictionary lazily across multiple servers through a protocol similar to the way in which web proxies share cached pages. However, such an approach is quite complex and can lead to poor deduplication ratios due to the coupling of lazy updates and backup workloads since a given server may not have the most up-to-date deduplication dictionary.

In particular embodiments described herein, different cloud gateways may be loosely coupled. For example, cloud gateways may be located in different geographies or regions or otherwise have limited direct communication between one another. For instance, an organization may have multiple sites where gateways are ingesting or migrating back-ups and/or long-term archival data to the cloud.

According to various embodiments, techniques and mechanisms described herein allow for efficient deduplication across an organization in which multiple gateways are used for data ingestion. Moreover, techniques and mechanisms described herein allow for such data deduplication even in the presence of loosely coupled gateways. Furthermore, techniques and mechanisms described herein allow for the achievement of high data deduplication ratios across an entire organization, regardless of location or origin of data. Accordingly, techniques and mechanisms described herein provide for substantial performance improvements of the system itself. Techniques and mechanisms related to the ingestion of data are discussed in additional detail with respect to FIG. 7.

Another key issue in any deduplication platform is the Garbage collection service, which is typically scheduled periodically to detect unreferenced chunks of data and delete them. In conventional data deduplication systems involving multiple servers, a garbage collection service may be distributed across a set of storage servers. However, such a configuration causes an input/output bottleneck because of the additional process contention and disk input/output involved in executing the garbage collection task.

According to various embodiments, techniques and mechanisms described herein provide for improved garbage collection techniques that avoid the bottlenecks associated with conventional approaches. Techniques and mechanisms related to garbage collection are discussed in further detail with respect to FIGS. 10 and 11. Techniques and mechanisms related to file removal are discussed in additional detail with respect to FIG. 12.

According to various embodiments, techniques and mechanisms described herein provide for a scalable and adaptive approach to global deduplication. For example, a micro-service architecture may run on top of a container platform such as Kubernetes or Docker. As another example, a micro-service architecture may employ standard key-value stores such as Cassandra. Accordingly, the global deduplication services may scale upward and downward in size according to service demands, without imposing input/output bottlenecks or wasting computing resources.

According to various embodiments, techniques and mechanisms described herein provide for a centralized data deduplication dictionary. Dictionary updates are available after commitment for gateways to retrieve and employ. Such availability provides for predictable deduplication savings without imposing dependencies on the nature of the workload.

According to various embodiments, techniques and mechanisms described herein provide for improved performance, for instance since the garbage collection services runs independently from the file ingestion process. For example, techniques and mechanisms described herein may provide for improved data ingestion and read-back performance. As another example, techniques and mechanisms described herein may reduce or eliminate CPU contention on the ingestion storage server (i.e. the gateway).

FIG. 1 shows a system 100 that embodies techniques and mechanisms described herein. The system includes clients A 102 through N 104 in communication with various computing devices via the internet 170.

According to various embodiments, each client may communicate with one or more cloud gateways such as the cloud gateways 106-112. Each cloud gateway may act as an interface to a cloud storage location. For example, a client may communicate with one or more gateways to store data to and/or retrieve data from one or more of the cloud storage locations 152-156. Additional details regarding the configuration and functionality of a gateway are discussed with respect to FIG. 2.

According to various embodiments, a gateway may be embodied in any of a variety of suitable computing devices. For example, a gateway may be implemented at least in part on a compute node in a cloud computing framework such as Amazon AWS or Microsoft Azure. As another example, a gateway may be implemented at least in part on computing hardware located on a client's local network. As yet another example, a gateway may be implemented at least in part on a computing device owned by a service provider such as the owner of the gateway.

In some implementations, gateways may be geographically clustered. For example, a client may communicate with a group of gateways located within the same geographically proximate data center. In such a configuration, the gateways may be tightly coupled and may coordinate storage operations with one another.

In some implementations, gateways may be geographically dispersed. For example, a client may communicate with a group of gateways located in different geographic locations. In such a configuration, the gateways may be loosely coupled and may act relatively independently from one another.

The cloud storage components shown in FIG. 1 may be managed at least in part by the cloud storage architecture 202. Additional details regarding the cloud storage architecture are discussed with respect to FIG. 3.

Figure 2:
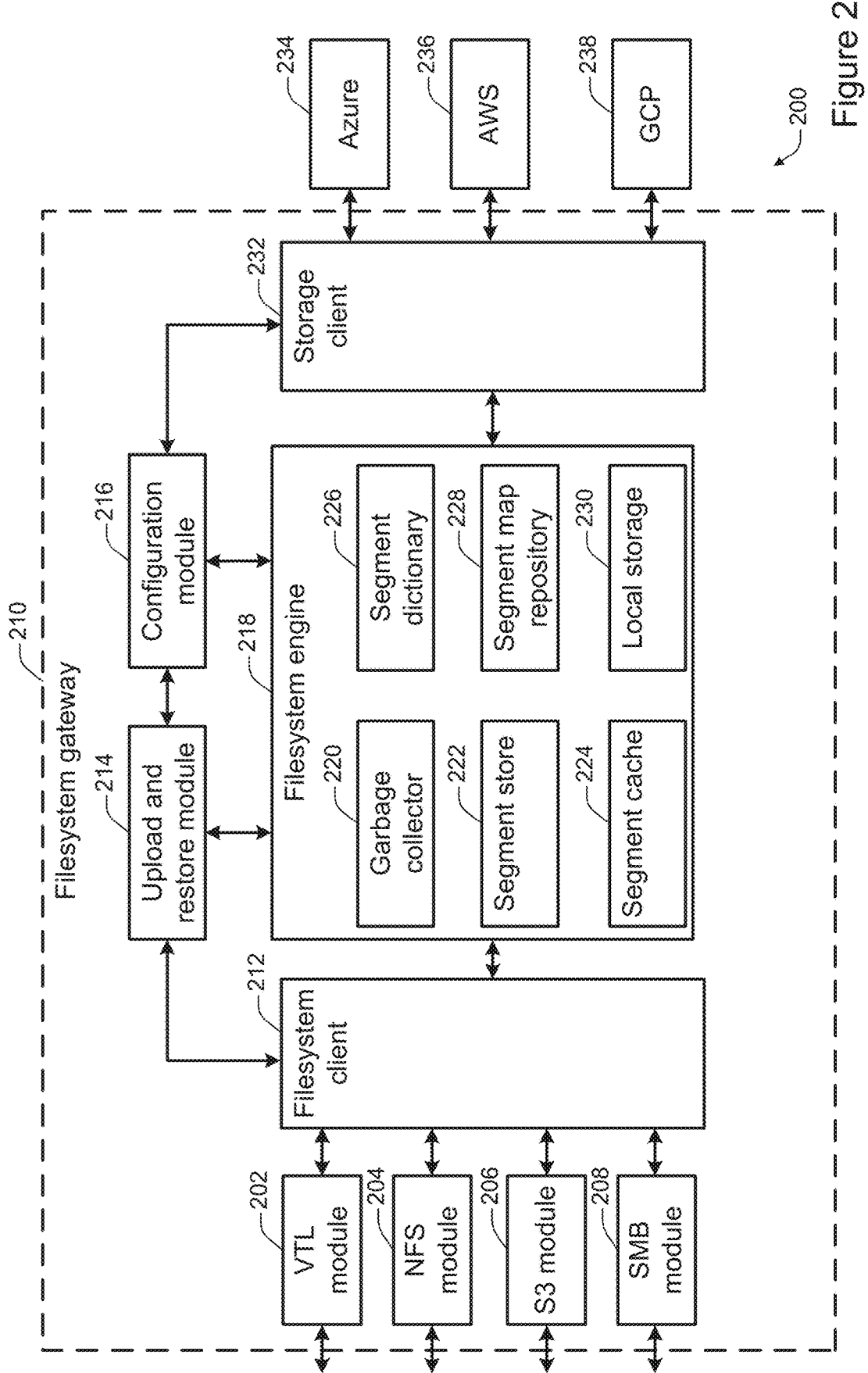
FIG. 2 illustrates an example of a filesystem gateway 210, configured in accordance with one or more embodiments.

FIG. 2 illustrates an example of a system 200 that embodies techniques and mechanisms described herein. The system 200 includes a filesystem gateway 210 that provides an interface between client machines and one or more cloud storage providers.

The filesystem gateway 210 includes a filesystem engine 218, which performs various operations related to ingesting and accessing files. According to various embodiments, the filesystem engine 218 may be implemented as a compute node, for example within a cloud computing system. Alternately, or additionally, portions of the filesystem engine 218 may be implemented in a different location, such as on a computing device associated with a client machine.

The filesystem client 212 may provide a POSIX-like interface to the filesystem engine. The filesystem client 212 may include one or more modules for facilitating access to the client via various protocols. A VTL module 202 may provide support for iSCSI VTL based backups and restores. An NFS module 204 may provide support for NFS export-based file IO. An S3 module 206 may provide an S3 interface for object-based access. An SMB module 208 may provide support for SMB share-based file IO.

At 214, an upload and restore module is shown. According to various embodiments, the upload and restore module may manage the upload of files when they are ready and archives them once they upload successfully. The upload and restore module may also perform the restore and periodic verification of those files upon request.

At 216, a configuration module is shown. According to various embodiments, the configuration module may interface with the cloud-based configuration and management service to perform operations such as obtaining configuration information, performing health monitoring, and providing stats and reporting information.

At 220, a garbage collector is shown. In some embodiments, the garbage collector 220 tracks the segment maps of files that have been removed from the namespace. The garbage collector 220 processes these segment maps in a transactional manner and deletes the segments no longer required since there are no files referencing them anymore. The garbage collector also ensures that no orphaned segments are left behind.

At 222, a segment store is shown. According to various embodiments, the segment store may track and maintains an on-disk index of segment related data and metadata. Such metadata may include, but is not limited to: segment compressed length, segment encrypted length, and segment reference count (i.e. refcount).

At 224, a segment cache is shown. In some implementations, segment cache may maintain an in-memory cache of recently accessed segments. Such recently accessed segments may be maintained in compressed or uncompressed form.

At 226, a segment dictionary is shown. According to various embodiments, the segment dictionary may be implemented as an on-disk data structure. The segment dictionary may store the segment hashes and the segment ID's they map to. This structure may facilitate storage deduplication in the cloud and may assist in improving upload efficiency.

At 228, a segment map repository is shown. According to various embodiments, the segment map may record the segments into which a file breaks up. A segment map may be stored in the cloud, for example in Page blobs. Alternately, or additionally, a segment map may be stored on-premise, for example in B-tree format.

At 230, a local storage module is shown. In some implementations, the local storage module may provide local storage for any of the information stored at the filesystem engine 218.

At 232, a storage client is shown. According to various embodiments, the storage client may support various cloud storage back-ends and provide a transparent interface to abstract away the differences between the internal cloud storage service APIs. Such cloud storage service APIs may include APIs for Microsoft Azure 234, Amazon AWS 236, Google Cloud Platform 238, and/or any other suitable cloud service provider.

Figure 3:
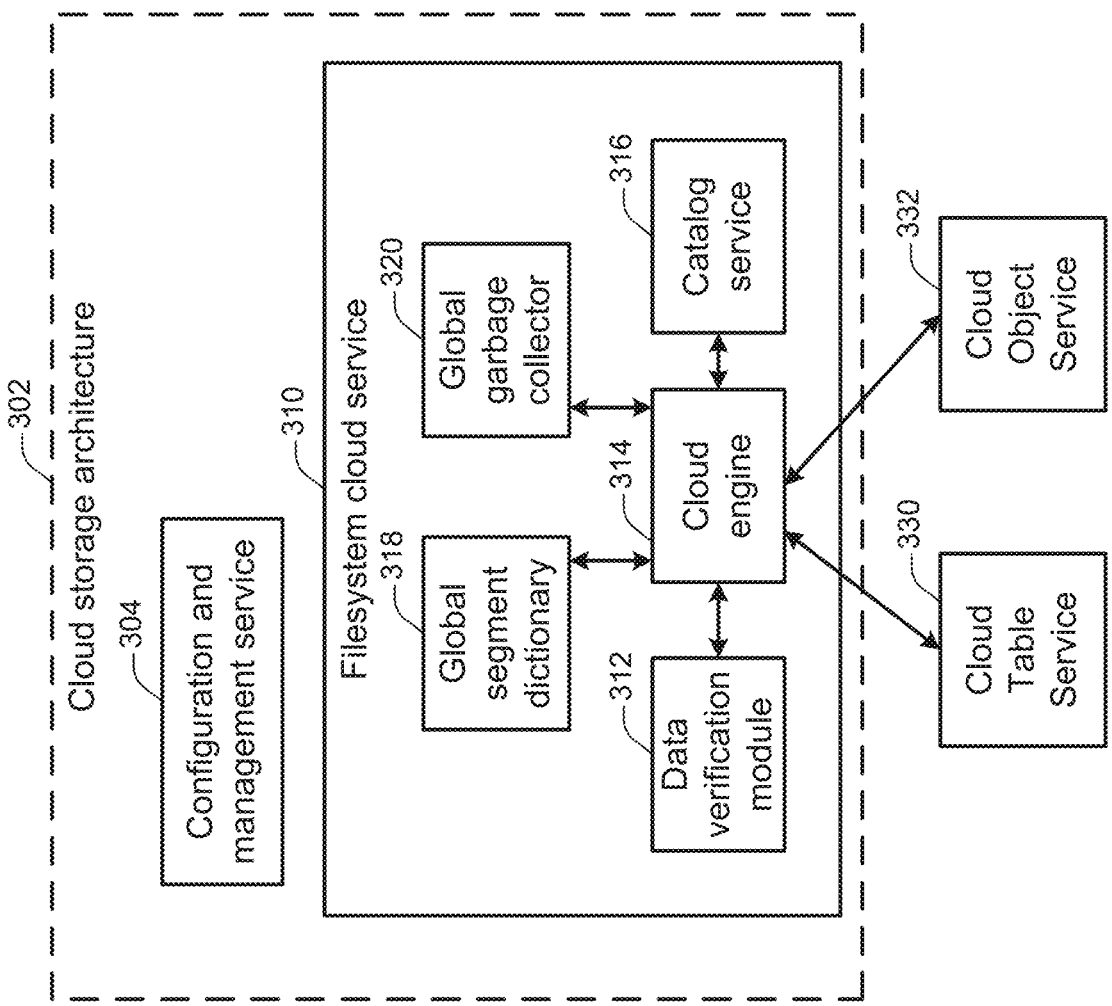
FIG. 3 illustrates an example of cloud storage architecture 302, configured in accordance with one or more embodiments.

FIG. 3 illustrates an example of a system 300 that embodies techniques and mechanisms described herein. The system 300 a cloud storage architecture 302 that includes various components implemented in the cloud and accessible to various cloud gateways.

At 304, a configuration and management service is shown. In some implementations, the configuration and management service 304 may run in any suitable cloud, such as the Microsoft Azure cloud. The configuration and management service 304 may provide configuration management, storage reporting functionality, and other such operations.

At 310, the filesystem cloud service is shown. According to various embodiments, the filesystem cloud service runs in the cloud and may provide cloud-based functionality such as data readability drills, a backup catalogue of all the files successfully backed up, and other such operations. The filesystem cloud service 310 may communicate over the filesystem protocol with the filesystem engine 118.

At 316, a catalog service is shown. According to various embodiments, the catalog service 316 may store any suitable information for the effective operation of the filesystem cloud service. For example, the catalog service may store a backup catalogue of the files successfully backed up.

At 312, a data verification module is shown. In some implementations, the data verification module is configured to perform any suitable data verification tasks. For example, the data verification module may periodically or upon request read data stored in the cloud and verify that the data remains accurate. Such a verification may involve, for instance, computing a hash of a data segment and comparing the hash to one previously generated and stored.

At 314, a cloud engine is shown. According to various embodiments, the cloud engine may act as a cloud-optimized module that is the counterpart of the on-premise filesystem engine. The cloud engine may provide the interface to the cloud filesystem stored data in the relevant cloud service (e.g., AWS S3/Glacier, Azure Blob/Archive, etc.) and the metadata in the cloud table service 330.

At 330, a cloud table service is shown, while at 332, a cloud object service is shown. According to various embodiments, the cloud table service 330 and the cloud object service 332 may be configured to store information in a tabular format and a blob format respectively. These services may be used to store the data maintained and employed by the filesystem cloud service 310. The services may be provided by any suitable cloud storage provider, such as Microsoft Azure.

At 318, a global segment dictionary is shown. According to various embodiments, the global segment dictionary 318 is a service that maintains a mapping of segment hash values to segment identifiers. A segment hash value may be implemented via any suitable hashing function, such as SHA-1. A segment identifier may be implemented as a 16-byte universally unique identifier.

In some embodiments, the global segment dictionary 318 may be implemented as a key value store. The segment hash may be stored as a key. The segment identifier may be stored as the value.

According to various embodiments, the global segment dictionary 318 may be implemented as a service in the cloud. For instance, the global segment dictionary 318 may be implemented as a micro-service on the Kubernetes platform.

In some embodiments, the global segment dictionary 318 may be implemented on top of a scalable key-value store such as Cassandra, Mongo, or Dynamo. The global segment dictionary 318 may expose one or more well-defined REST-based APIs used by the gateway to perform operations such as lookup, commit, and delete.

According to various embodiments, a lookup operation may provide a batched lookup for a group of segment hashes. A lookup request sent by the gateway may include a list of segment hash values. The lookup response from the global segment dictionary 318 may include segment identifiers identified by performing a lookup of the key-value store using the segment hash as a key.

According to various embodiments, a commit operation may involve the gateway transmitting a list of unique segments, including hash values and identifiers. The global segment dictionary 318 may process this request and update the key-value store by storing the segment hashes and their identifiers. Then, the global segment dictionary 318 may transmit a response message that acknowledges the success or failure of the operation.

At 320, a global garbage collector is shown. According to various embodiments, the global garbage collector 320 is a service that is responsible for deleting unreferenced segments. The global garbage collector 320 may interact with the dictionary service to purge the deleted segments from the dictionary.

According to various embodiments, the global garbage collector 320 may be implemented as a service in the cloud. For instance, the global garbage collector 320 may be implemented as a micro-service on the Kubernetes platform.

Figure 4:
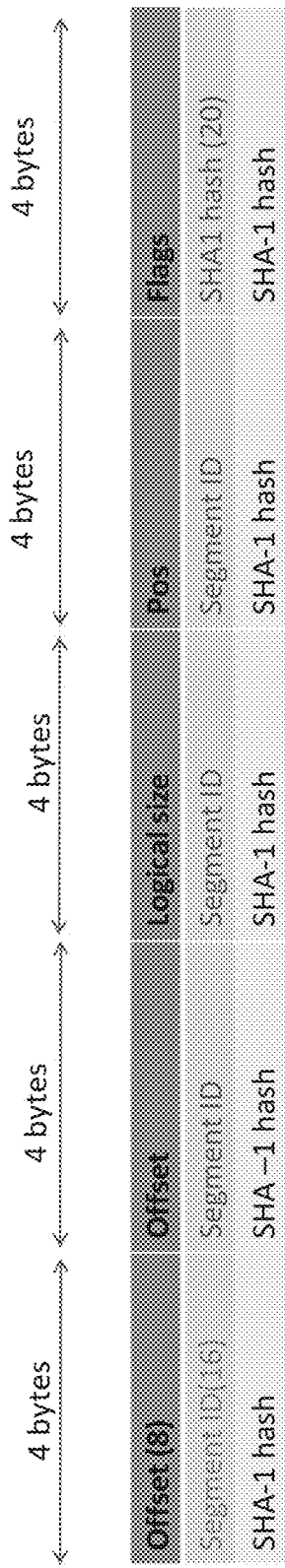
FIG. 4 shows an example of a segment map entry 402, configured in accordance with one or more embodiments.

FIG. 4 shows a representation of a segment map entry format. According to various embodiments, the segment map entry shown in FIG. 3 represents the mapping between a logical offset range of a file to the segment that stores the data for that range.

Figure 5:
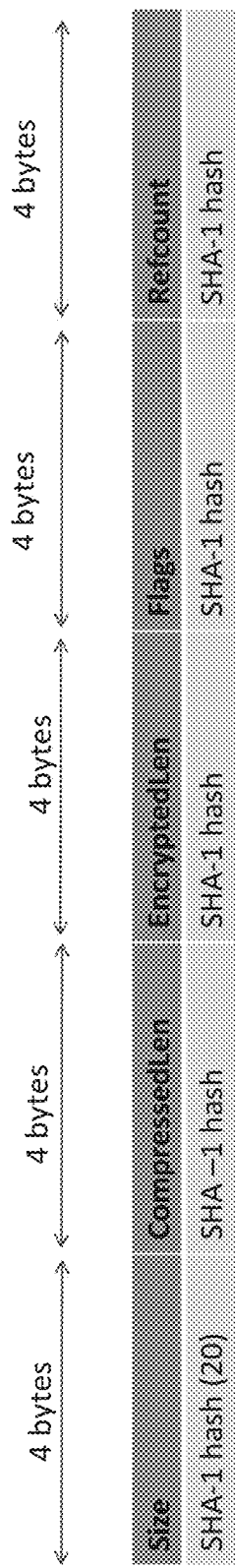
FIG. 5 shows an example of a segment store entry 502, configured in accordance with one or more embodiments.

FIG. 5 shows a representation of a segment store entry format. According to various embodiments, the segment store entry shown in FIG. 4 represents the header that is present before the actual segment data.

Features such as the byte sizes and the encryption formats shown in FIGS. 4 and 5 are included for illustrative purposes only. According to various embodiments, segment entry portion sizes other than 4 bytes may be used. Alternately, or additionally, hashing functions other than SHA-1 may be used.

Figure 6:
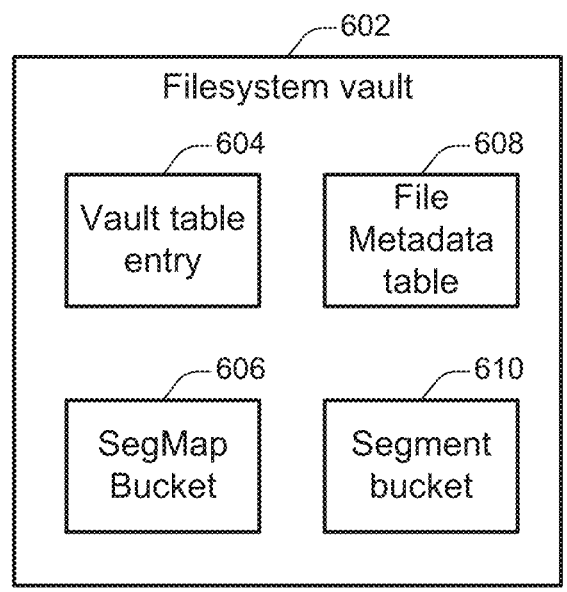
FIG. 6 shows an example of a filesystem vault 602, configured in accordance with one or more embodiments.

FIG. 6 shows a representation of a filesystem vault 602. According to various embodiments, a filesystem vault is a logical entity that has components in various locations. The filesystem vault 602 includes a vault table entry 604, a file metadata table 608, a SegMap bucket 606, and a segment bucket 610.

In some embodiments, a vault may be accessible to a client machine via any of a variety of suitable communications protocols. In this way, the filesystem client may serve as an API to allow the client machine to treat the cloud storage location as if it were a specific type of local or remote storage, regardless of how the files are actually stored. For example, from the perspective of the client, a filesystem vault may be treated as an NFS export, SMB share, VTL tape library, S3 bucket, or any other storage location accessible via a suitable storage protocol. A filesystem vault may be accessed concurrently by one or more physical or virtual clients.

In some embodiments, the segment bucket 610 is the location at which individual segments are stored, for instance as blobs. A segment bucket may be implemented using any suitable cloud storage location. For example, a filesystem vault may be implemented as an S3 bucket or Google Storage bucket.

According to various embodiments, the SegMap bucket 606 is the location at which segment maps are stored. The segment maps may map individual segments to files. For example, the segment maps may indicate which segments are included in a file and identify the order in which the segments are arranged to create the file.

According to various embodiments, the file metadata table 608 stores attributes of the files stored in the filesystem vault 602. For example, the file metadata table 608 may be a table included in the cloud table service 330. The file metadata table may store information that may include, but is not limited to: logical size, Mtime, file path relative to the device, statbuf info, SegMap ID, and extended attributes. The SegMap ID may identify the page blob that holds the SegMap entries, for example in the format shown in FIG. 4.

In some embodiments, the vault table entry 604 is an entry in a vault table included in the cloud table service 330. Each vault table 604 includes configuration information associated with a specific vault. For example, a vault table entry may identify the name and/or location of the SegMap bucket 606, the segment bucket 610, and the file metadata bucket 608. As another example, a vault table entry may identify configuration information that may include, but is not limited to: a compression policy, a deduplication policy, and an encryption policy.

Figure 7:
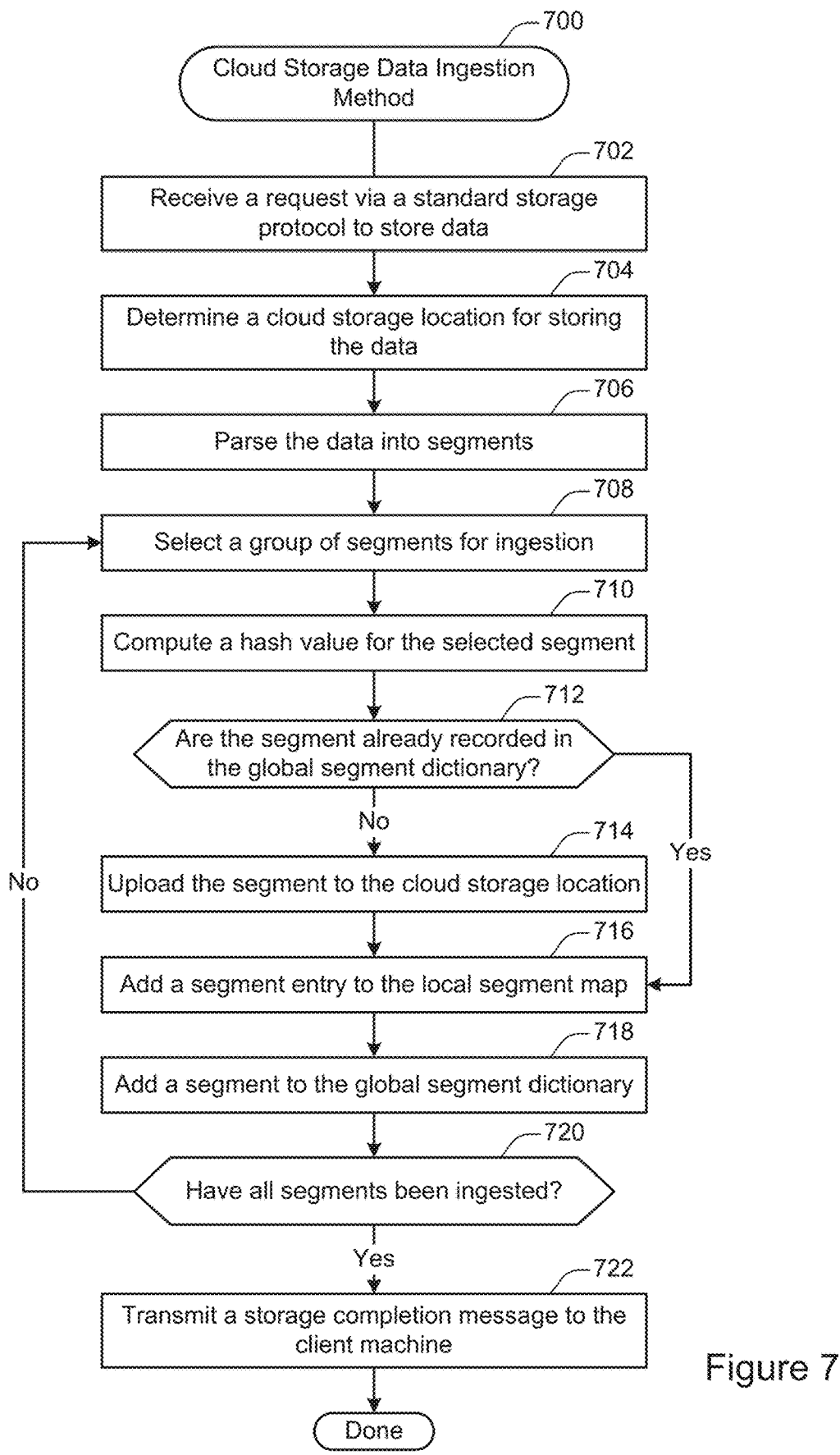
FIG. 7 illustrates an example of a method for cloud storage data ingestion, performed in accordance with one or more embodiments.

FIG. 7 illustrates an example of a cloud storage data ingestion method 700, performed in accordance with one or more embodiments. According to various embodiments, the method 700 may be performed at a client machine and gateway device in communication via the internet.

At 702, a request is received via a standard storage protocol to store data. According to various embodiments, the request may be received at a filesystem client. The filesystem client may reside at a gateway. Alternately, the filesystem client may reside at the client. For instance, the filesystem client may reside on the client machine itself or on a device located on a network local to the client machine.

At 704, a cloud storage location for storing the data is determined. According to various embodiments, any suitable cloud storage location may be used. For example, the client may be associated with configuration information that specifies that data should be stored to an Amazon S3 bucket.

The data is parsed into segments at 706. In some embodiments, the data may include one or more files. According to various embodiments, any suitable parsing technique may be used. For example, a file may be parsed into segments of fixed length. As another example, a file may be parsed into segments of variable length segments by applying a parsing algorithm that separates at consistent points, which may facilitate improved deduplication.

At 708, a segment is selected for ingestion. In some embodiments, segments may be ingested sequentially or in any other suitable serial order. Alternately, segments may be ingested in parallel. For example, different segments may be ingested by different gateways, which may improve throughout.

In particular embodiments, each file may be broken up into chunks, which may then be further divided into segments. Each chunk may then be processed as a separate transaction before moving on to the next chunk. Alternately, chunks may be processed in parallel. For example, a chunk could be 256 MB of data, with a segment size of 1 MB. Various operations (e.g., 708-720) may then be batched at the chunk level.

At 710, a hash value of the segment is computed. In some implementations, the hash value may be computed at a location local to the client device. Alternately, the hash value may be computed at the gateway at a location remote from the client device. The hash value may be computed using any suitable hashing technique, such as MD5 or SHA-1.

At 712, a determination is made as to whether the segment is already recorded in the global segment dictionary. In some embodiments, the determination may be made by comparing the hash value of the segment to the hash value of segments stored within the dictionary.

In particular embodiments, the determination made at operation 712 may involve transmitting a query to the global segment dictionary 318 shown in FIG. 3. As discussed with respect to FIG. 3, the global segment dictionary 318 may maintain a record of data segments that spans multiple gateways. The global segment dictionary 318 may then respond to the request by indicating that the segments that do not have a corresponding segment identifier stored in the global segment dictionary are unique.

In some implementations, the global segment dictionary 318 may span multiple organizations or accounts. Alternately, the global segment dictionary 318 may span multiple gateways but may be specific to an organization or account in terms of data scope.

If the segment is not already recorded within the segment dictionary, then at 714 the segment is uploaded to the cloud storage location.

At 716, a segment entry is added to the local segment map. According to various embodiments, the segment map may include an entry for each segment and may indicate how segments are combined to form files.

At 718, the segment is added to the global segment dictionary. For example, a commit request may indicate one or more unique segments to add to the dictionary. Once a successful commit request is acknowledged by the dictionary, then the transaction is transmitted. Otherwise, the transaction is aborted.

At 720, a determination is made as to whether all segments have been ingested. If not, then the next segment is selected for ingestion at operation 708. If so, then at 722 a storage completion message is transmitted to the client machine.

According to various embodiments, the operations discussed with respect to FIG. 7 may be performed in an order other than that shown. For example, segment lookups to the global segment dictionary may be batched. Then, a list of segment hashes and corresponding segment ID's may be generated at once and transmitted to the global dictionary as part of a lookup request. Similarly, the adding of segments to the global segment dictionary and/or the uploading of segments to the cloud storage location may be performed in a batched manner.

Figure 8:
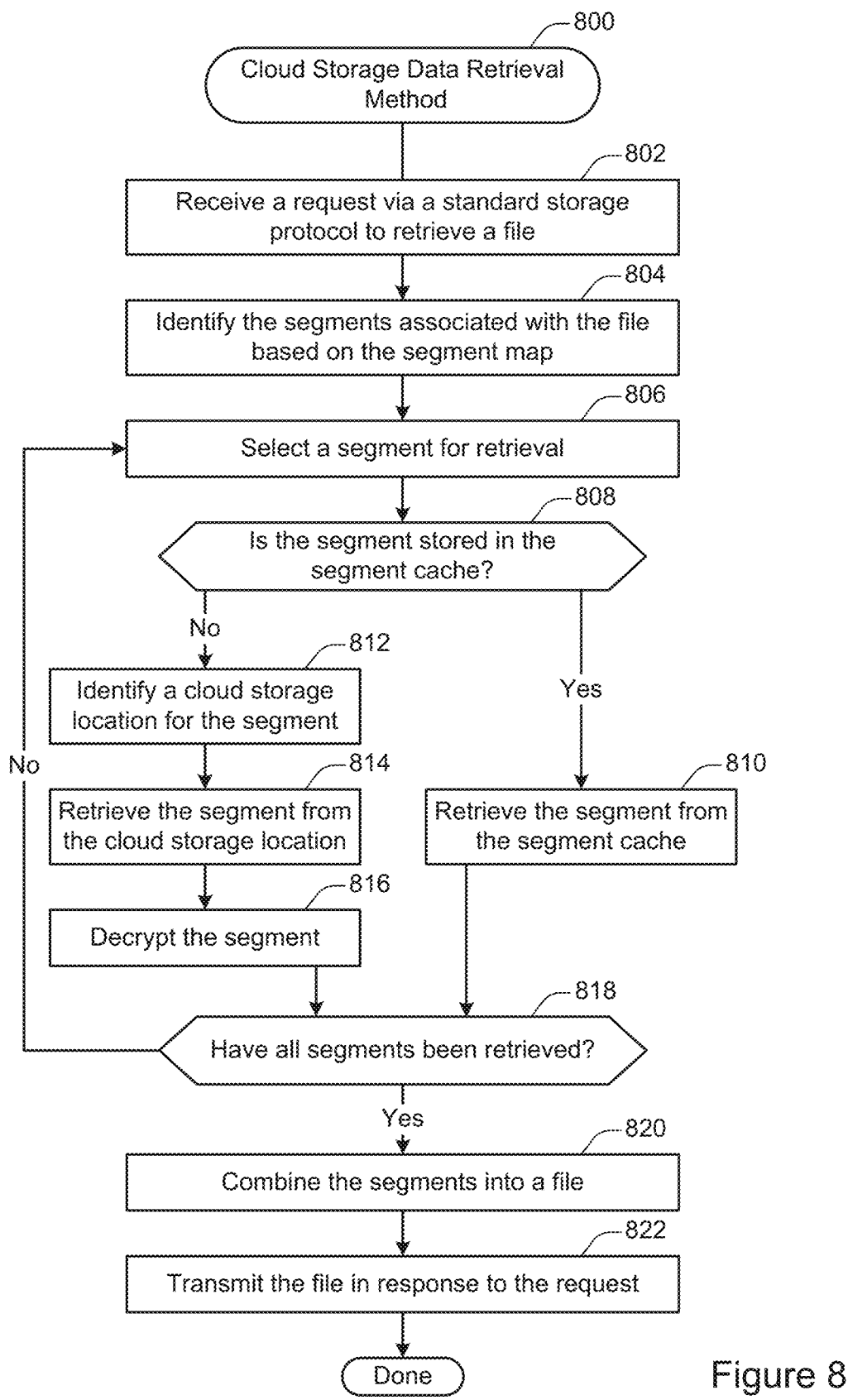
FIG. 8 illustrates an example of a method for cloud storage data retrieval, performed in accordance with one or more embodiments.

FIG. 8 illustrates an example of a cloud storage data retrieval method 800, performed in accordance with one or more embodiments. According to various embodiments, the method 800 may be performed at a client machine and gateway device in communication via the internet.

At 802, a request to retrieve a file is received via a standard storage protocol. According to various embodiments, the request may be received at a filesystem client. The filesystem client may reside at a gateway. Alternately, the filesystem client may reside at the client. For instance, the filesystem client may reside on the client machine itself or on a device located on a network local to the client machine.

At 804, the segments associated with the file are identified based on the segment map. In some embodiments, the segment map may include a list of the segments associated with each file, along with information such as a location at which a segment is stored.

At 806, a segment is selected for retrieval. In some embodiments, segments may be retrieved sequentially or in any other suitable serial order. Alternately, segments may be retrieved in parallel. For example, different segments may be retrieved by different gateways, which may improve throughout.

At 808, a determination is made as to whether the segment is stored in the segment cache. If the segment is stored in the segment cache, then it may be retrieved from the segment cache at operation 810. According to various embodiments, the segment cache may store segments recently accessed by the gateway.

If instead the segment is not stored in the segment cache, then it is retrieved from cloud storage at operations 812-816. At operation 812, a cloud storage location for the segment is identified. For example, the location may be identified from the segment map. At operation 814, the segment is retrieved from the identified cloud storage location. At 816, the retrieved segment is decrypted.

At 818, a determination is made as to whether all segments have been retrieved. If the segments have not all been retrieved, then the next segment may be selected for retrieval at operation 806.

If instead all segments have been retrieved, then the segments are combined into a file at 820. In some embodiments, the segment map may include information such as segment ordering data that indicates how the segments associated with a file may be combined to reconstruct the file. Once the file is reconstructed, at 822 the file is transmitted to the client in response to the request.

Figure 9:
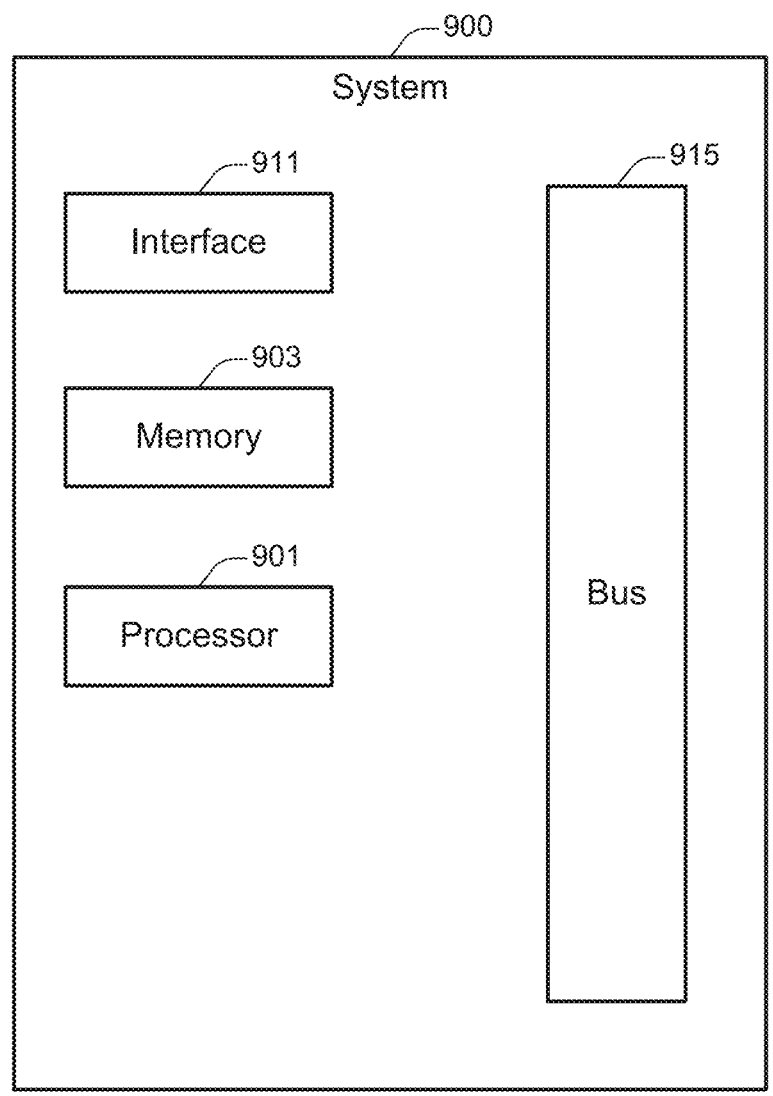
FIG. 9 illustrates an example of a server, configured in accordance with one or more embodiments.

FIG. 9 illustrates one example of a server. According to particular embodiments, a system 900 suitable for implementing particular embodiments of the present invention includes a processor 901, a memory 903, an interface 911, and a bus 919 (e.g., a PCI bus or other interconnection fabric). When acting under the control of appropriate software or firmware, the processor 901 is responsible for implementing applications such as a virtual machine, metadata system, or other such component of the system described herein. Various specially configured devices can also be used in place of a processor 901 or in addition to processor 901. The interface 911 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 900 is a virtual machine configured to communicate with one or more clients and one or more cloud storage systems. Although a particular server is described, it should be recognized that a variety of alternative configurations are possible. For example, the modules may be implemented on another device connected to the server.

According to various embodiments, one or more methods described herein may be implemented entirely or in part on the system 900. Alternately, or additionally, one or more methods described herein may be embodied entirely or in part as computer programming language instructions implemented on one or more non-transitory machine-readable media. Such media may include, but are not limited to: compact disks, spinning-platter hard drives, solid state drives, external disks, network attached storage systems, cloud storage systems, system memory, processor cache memory, or any other suitable non-transitory location or locations on which computer programming language instructions may be stored.

Figure 10:
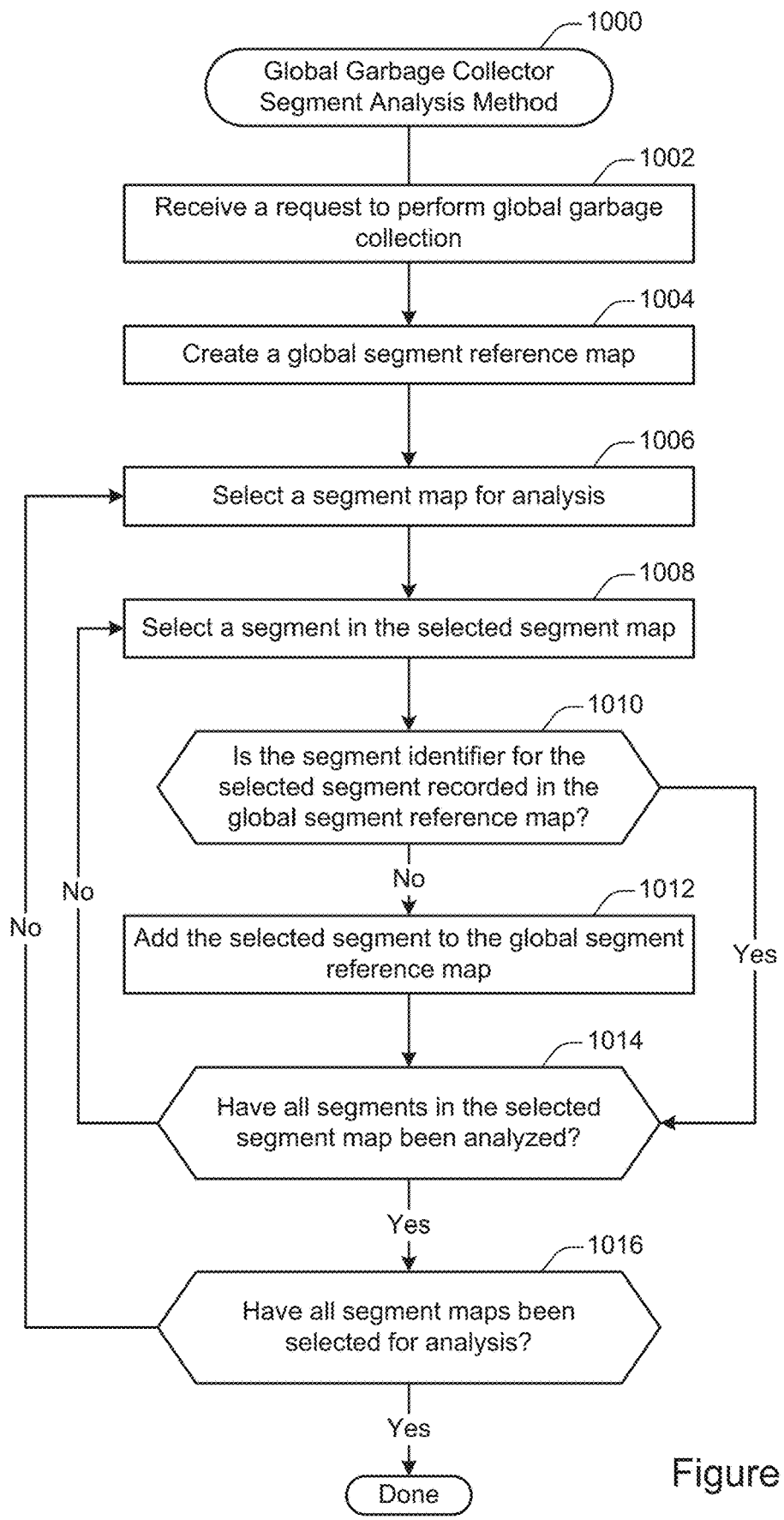
FIG. 10 illustrates an example of a method for global garbage collector segment analysis, performed in accordance with one or more embodiments.

FIG. 10 illustrates an example of a global garbage collector segment analysis method 1000, performed in accordance with one or more embodiments. According to various embodiments, the method 1000 may be performed at a one or more components of a cloud computing system, including but not limited to the global garbage collector 320.

At 1002, a request to perform global garbage collection segment analysis is received. According to various embodiments, global garbage collection segment analysis may be performed periodically, at schedule times, or upon request. For example, the request may be generated once per day, once per hour, after the detection of a designated number of file deletions, or at some other time interval.

At 1004, a global segment reference map is created. According to various embodiments, the global segment reference map may be any suitable data structure that allows the identification of those segments associated with at least one reference. For example, the global segment reference map may be instantiated as an empty list or set.

In particular embodiments, the global segment reference map may be implemented as a Bloom filter. A Bloom filter is a space-efficient probabilistic data structure used to test whether an element is a member of a set. In general, a query to a Bloom filter may return a false positive but not a false negative. The Bloom filter may be created by constructing an array having a sufficient number of bits to provide a sufficiently low false-positive rate. Each bit may correspond to a particular hash function. The specific size of the Bloom filter may be strategically determined based on considerations such as the acceptable false positive rate and the number of segments to be analyzed.

At 1006, a segment map is selected for analysis. According to various embodiments, the segment map may be stored in a segment map repository located in a dedicated bucket in the cloud object service 332. The segment map repository may be accessible to various components, such as the global garbage collector 320 and the gateways. Then, a segment is selected from the segment map for analysis at operation 1008.

At 1010 a determination is made as to whether the segment identifier for the selected segment is recorded in the global segment reference map. According to various embodiments, the determination may be made by querying the data structure created at the operation 1004.

In particular embodiments, in the case of a Bloom filter, each of the hash functions associated with the Bloom filter may be applied to the segment identifier. For the hash values that are 1 rather than 0, the segment identifier is not in the global segment reference map if any of the corresponding bit values are 0 rather than 1.

The selected segment is added to the global segment reference map at operation 1012 if it is determined that the segment identifier is not recorded in the global segment reference map. According to various embodiments, the segment may be added to the global segment reference map by updating the data structure created at the operation 1004.

In particular embodiments, in the case of a Bloom filter, each bit that corresponds to a hash value of 1 may be set to 1 if it was previously set to 0.

At 1014, a determination is made as to whether all segments in the selected segment map have been analyzed. If not, then the next segment is selected for analysis. If so, then at 1016 a determination is made as to whether all segments have been selected for analysis. If not, then the next segment map is selected for analysis. According to various embodiments, segments and segment maps may be analyzed in parallel or in any suitable sequence.

Figure 11:
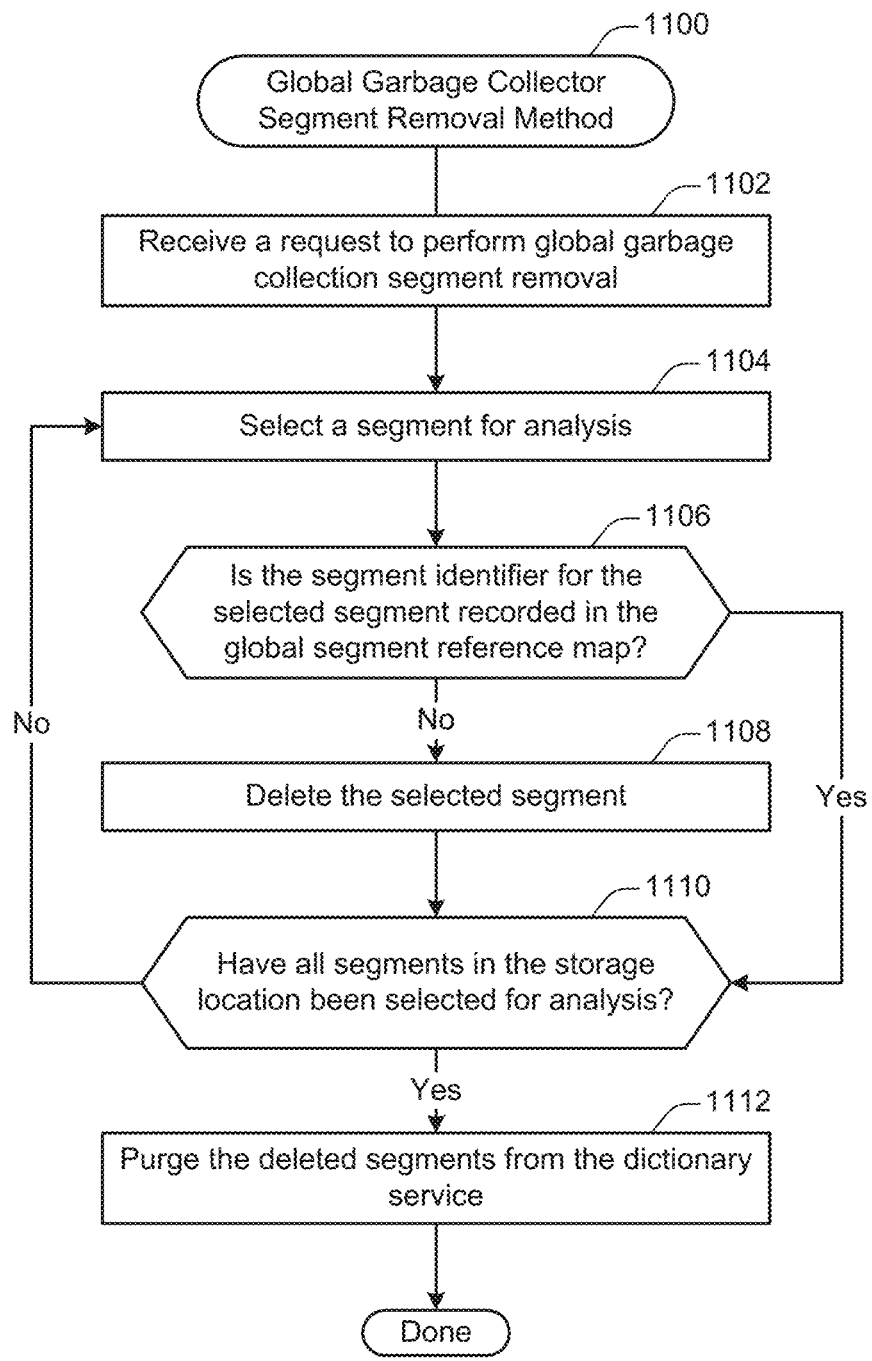
FIG. 11 illustrates an example of a method for global garbage collector segment removal, performed in accordance with one or more embodiments.

FIG. 11 illustrates an example of a global garbage collector segment removal method 1100, performed in accordance with one or more embodiments. According to various embodiments, the method 1100 may be performed at a one or more components of a cloud computing system, including but not limited to the global garbage collector 320.

At 1102, a request to perform global garbage collection segment removal is received. According to various embodiments, global garbage collection segment removal may be performed periodically, at scheduled times, or upon request. For example, the request may be generated automatically upon completion of the global garbage collector segment analysis method 1000 shown in FIG. 10.

At 1104, a segment is selected for analysis. According to various embodiments, segments may be selected by retrieving a unique list of segment identifiers from the global segment dictionary 318.

At 1106, a determination is made as to whether the segment identifier for the selected segment is recorded in the global segment reference map. In some embodiments, the determination may be made by comparing the segment identifier to the list of segment identifiers stored in the global segment reference map constructed as discussed with respect to the method 1000 shown in FIG. 10.

If the selected segment is not recorded, then the selected segment is deleted at operation 1108. According to various embodiments, the selected segment may be deleted by sending an instruction to the cloud storage location to delete the segment.

At 1110, a determination is made as to whether all segments in the storage location have been selected for analysis. According to various embodiments, the segments may be analyzed in parallel or in any suitable sequence.

If all segments in the storage location have been selected for analysis, then at operation 1112 the deleted segments are purged from the dictionary service. In some implementations, the deleted segments may be purged from the dictionary service by removing the entries corresponding with the deleted segments from the global segment dictionary 318.

Figure 12:
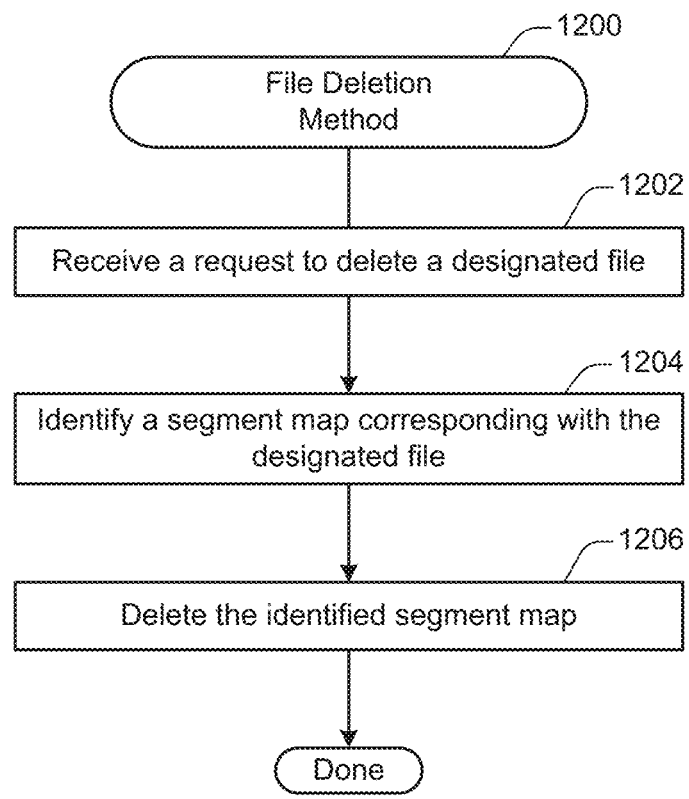
FIG. 12 illustrates an example of a method for file deletion, performed in accordance with one or more embodiments.

FIG. 12 illustrates an example of a file deletion method 1200, performed in accordance with one or more embodiments. According to various embodiments, the method 1200 may be performed at a gateway in communication with cloud architecture.

At 1202, a request is received to delete a designated file. According to various embodiments, the request may be received at a gateway. For instance, the request may be generated in response to a file deletion request received at the filesystem client 212 via an interface using a standard cloud storage protocol.

A segment map corresponding with the designated file is identified at operation 1204. In some embodiments, the segment map may be identified by querying the segment map repository 228 using an identifier associated with the file. The segment map repository 228 may then identify the segment map associated with the designated file and provide information for retrieving the segment map from storage.

The identified segment map is deleted at operation 1206. According to various embodiments, deleting the segment map may involve operations such as removing the segment map from the cloud storage system and/or deleting any references to the segment map from the segment map repository.

In some implementations, by deleting the identified segment map, the segments included in the segment map will no longer be referenced in association with the designated file. Accordingly, the number of references made to those segments in cloud storage are reduced. When the global garbage collector segment analysis method 1000 is performed, the segments associated with the designated file that have no more references to them remaining will not be added to the global segment reference map. Then, when the global garbage collector segment removal method 1100 is performed, the unreferenced segments will be removed from the system.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method comprising:
   dividing a file into a plurality of data segments at a virtual machine configured to facilitate communication between a client machine and one or more cloud storage back-ends, the client machine using one or more processors to run standard storage protocols configured for use in a network-attached storage system, the one or more cloud storage back-ends not supporting the standard storage protocols but having a cloud storage application program interface (API), the virtual machine configured to facilitate communication between the client machine and one or more cloud storage back-ends, the virtual machine appearing to the client machine as a network-attached storage system and transparently connecting the client machine to the one or more cloud storage back-ends;
   inserting a plurality of local segment entries into a local segment map on a local device, the local segment map including information on the file and the plurality of data segments;
   inserting a plurality of global segment entries into a global segment reference map in a cloud storage location when it is determined that the data segments have not been previously added to the global segment reference map, wherein the global segment reference map in the cloud storage location is separate from the local segment map on the local device; and
   deleting from the cloud storage location each of the plurality of data segments that are not added to the global segment reference map, wherein deleting from the cloud storage location each of the plurality of data segments is associated with a process of deduplicating the plurality of data segments.

2. The method of claim 1, wherein creating the respective entries in a global segment reference map includes identifying a first data segment and identifying a second data segment different from the first data segment, the first data segment representing a first logical offset of data corresponding to a file, the second data segment representing to second logical offset of data corresponding to the file.

3. The method of claim 1, the method further comprising:
   identifying a first segment map, the first segment map including a first set of segment identifiers;
   identifying a second segment map, the second segment map including a second set of segment identifiers;
   creating a first set of entries in the global segment reference map based on the first set of segment identifiers;
   determining that second set of segment identifier are not identical to the first set of segment identifiers; and
   creating a second set of entries in the global segment reference map based on the second set of segment identifiers.

4. The method of claim 3, wherein at least one entry from the first set of entries in the global segment reference map is created concurrently with at least one entry from the second set of entries in the global segment reference map.

5. The method of claim 1, the method further comprising:
   processing a request to delete a file from the cloud storage location;
   responsive to the request to delete the file from the cloud storage location, removing a first segment map associated with the file, the segment map referencing a first set of segments;
   identifying a plurality of segments stored at the cloud storage location; and
   determining that the first set of segments are referenced as entries in the global segment reference map.

6. The method of claim 1, the method further comprising:
   identifying a plurality of segments stored at the cloud storage location;
   determining that at least on unreferenced segment stored at the cloud storage location is not referenced as a global entry in the global segment reference map; and
   deleting the unreferenced segment from the cloud storage location.

7. The method of claim 1, wherein the global segment reference map is implemented using a bloom filter.

8. A device, comprising:
   memory; and
   one or more processors configured as a virtual machine configured to facilitate communication between a client machine and one or more cloud storage back-ends, the client machine using one or more processors to run standard storage protocols configured for use in a network-attached storage system, the one or more cloud storage back-ends not supporting the standard storage protocols but having a cloud storage application program interface (API), the virtual machine configured to facilitate communication between the client machine and one or more cloud storage back-ends, the virtual machine appearing to the client machine as a network-attached storage system and transparently connecting the client machine to the one or more cloud storage back-ends, the one or more processors configured to:
divide a file into a plurality of data segments;
insert a plurality of local segment entries into a local segment map on a local device, the local segment map including information on the file and the plurality of data segments;
insert a plurality of global segment entries into a global segment reference map in a cloud storage location when it is determined that the data segments have not been previously added to the global segment reference map, wherein the global segment reference map in the cloud storage location is separate from the local segment map on the local device; and
delete from the cloud storage location each of the plurality of data segments that are not added to the global segment reference map, wherein deleting from the cloud storage location each of the plurality of data segments is associated with a process of deduplicating the plurality of data segments.

9. The device of claim 8, wherein the one or more processors are configured to create the respective entries in a global segment reference map by identifying a first data segment and identifying a second data segment different from the first data segment, the first data segment representing a first logical offset of data corresponding to a file, the second data segment representing to second logical offset of data corresponding to the file.

10. The device of claim 8, wherein the one or more processors are further configured to:
identify a first segment map, the first segment map including a first set of segment identifiers;
identify a second segment map, the second segment map including a second set of segment identifiers;
create a first set of entries in the global segment reference map based on the first set of segment identifiers;
determine that second set of segment identifier are not identical to the first set of segment identifiers; and
create a second set of entries in the global segment reference map based on the second set of segment identifiers.

11. The device of claim 10, wherein at least one entry from the first set of entries in the global segment reference map is created concurrently with at least one entry from the second set of entries in the global segment reference map.

12. The device of claim 8, wherein the one or more processors are further configured to:
process a request to delete a file from the cloud storage location;
responsive to the request to delete the file from the cloud storage location, remove a first segment map associated with the file, the segment map referencing a first set of segments;
identify a plurality of segments stored at the cloud storage location; and
determine that the first set of segments are referenced as entries in the global segment reference map.

13. The device of claim 8, wherein the one or more processors are further configured to:
identify a plurality of segments stored at the cloud storage location;
determine that at least on unreferenced segment stored at the cloud storage location is not referenced as an entry in the global segment reference map; and
delete the unreferenced segment from the cloud storage location.

14. The device of claim 8, wherein the global segment reference map is implemented using a bloom filter.

15. A computer program product comprising one or more non-transitory computer readable media having instructions stored thereon for performing a method, the method comprising:
dividing a file into a plurality of data segments at a virtual machine configured to facilitate communication between a client machine and one or more cloud storage back-ends, the client machine using one or more processors to run standard storage protocols configured for use in a network-attached storage system, the one or more cloud storage back-ends not supporting the standard storage protocols but having a cloud storage application program interface (API), the virtual machine configured to facilitate communication between the client machine and one or more cloud storage back-ends, the virtual machine appearing to the client machine as a network-attached storage system and transparently connecting the client machine to the one or more cloud storage back-ends;
inserting a plurality of local segment entries into a local segment map on a local device, the local segment map including information on the file and the plurality of data segments;
inserting a plurality of global segment entries into a global segment reference map in a cloud storage location when it is determined that the data segments have not been previously added to the global segment reference map, wherein the global segment reference map in the cloud storage location is separate from the local segment map on the local device; and
deleting from the cloud storage location each of the plurality of data segments that are not added to the global segment reference map, wherein deleting from the cloud storage location each of the plurality of data segments is associated with a process of deduplicating the plurality of data segments.

16. The computer program product of claim 15, wherein creating the respective entries in a global segment reference map includes identifying a first data segment and identifying a second data segment different from the first data segment, the first data segment representing a first logical offset of data corresponding to a file, the second data segment representing to second logical offset of data corresponding to the file.

17. The computer program product of claim 15, the method further comprising:
identifying a first segment map, the first segment map including a first set of segment identifiers;
identifying a second segment map, the second segment map including a second set of segment identifiers;
creating a first set of entries in the global segment reference map based on the first set of segment identifiers;

determining that second set of segment identifier are not identical to the first set of segment identifiers; and creating a second set of entries in the global segment reference map based on the second set of segment identifiers.

18. The computer program product of claim 17, wherein at least one entry from the first set of entries in the global segment reference map is created concurrently with at least one entry from the second set of entries in the global segment reference map.

19. The computer program product of claim 15, the method further comprising:

processing a request to delete a file from the cloud storage location;

responsive to the request to delete the file from the cloud storage location, removing a first segment map associated with the file, the segment map referencing a first set of segments;

identifying a plurality of segments stored at the cloud storage location; and determining that the first set of segments are referenced as entries in the global segment reference map.

20. The computer program product of claim 15, the method further comprising:

identifying a plurality of segments stored at the cloud storage location;

determining that at least on unreferenced segment stored at the cloud storage location is not referenced as an entry in the global segment reference map; and deleting the unreferenced segment from the cloud storage location.

* * * * *